(12) United States Patent
Cliff et al.

(10) Patent No.: US 11,867,285 B2
(45) Date of Patent: *Jan. 9, 2024

(54) SYSTEMS AND METHODS FOR PRESSURIZING TRANSMISSION CHARGE OIL

(71) Applicant: DEERE & COMPANY, Moline, IL (US)

(72) Inventors: Michael J. Cliff, Coffeyville, KS (US); Benjamin K. Dollins, Independence, KS (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/165,488

(22) Filed: Feb. 7, 2023

(65) Prior Publication Data

US 2023/0184324 A1 Jun. 15, 2023

Related U.S. Application Data

(63) Continuation of application No. 16/911,507, filed on Jun. 25, 2020, now Pat. No. 11,662,017.

(51) Int. Cl.
*F16H 61/00* (2006.01)
*F16H 63/30* (2006.01)

(52) U.S. Cl.
CPC ..... *F16H 61/0031* (2013.01); *F16H 63/3023* (2013.01); *F16H 2061/0034* (2013.01)

(58) Field of Classification Search
CPC ............ F16H 61/0031; F16H 63/3023; F16H 2061/0034; F15B 3/00; F15B 1/24; F15B 11/08; F15B 13/04; F15B 19/00; F15B 21/087

See application file for complete search history.

(56) References Cited

U.S. PATENT DOCUMENTS

| | | | |
|---|---|---|---|
| 2014/0318115 A1* | 10/2014 | Schulz | F15B 21/14 138/31 |
| 2014/0325974 A1* | 11/2014 | Schulz | F15B 21/14 60/414 |
| 2015/0152889 A1* | 6/2015 | Schulz | F15B 11/032 60/414 |

FOREIGN PATENT DOCUMENTS

| | | |
|---|---|---|
| DE | 10006013 A1 | 8/2001 |
| DE | 202005000083 U1 | 3/2005 |
| DE | 102010019434 A1 | 11/2011 |

OTHER PUBLICATIONS

German Search Report issued in application No. DE102021116234.3 dated Jun. 8, 2022 (04 pages), which is a German counterpart application of U.S. Appl. No. 16/911,507.

* cited by examiner

*Primary Examiner* — Tisha D Lewis

(57) ABSTRACT

Systems, methods, and apparatuses for operating a machine using energy stored in a compress gas are disclosed. Energy stored in the compressed gas may be used to pressurize a fluid, such as transmission fluid, and the pressurized fluid may be used to effectuate an operation of the machine, such as a transmission, and the operation of the machine may involve shifting of a transmission. The gas may be compressed with another fluid that is different from the fluid used to operate the machine, and the two fluid may be prevented from being mixed together.

15 Claims, 4 Drawing Sheets

SYSTEMS AND METHODS FOR PRESSURIZING TRANSMISSION CHARGE OIL

CROSS-REFERENCE TO RELATED APPLICATIONS

This application is a continuation of prior application Ser. No. 16/911,507, filed Jun. 25, 2020, the entire contents of which are incorporated herein by reference.

FIELD OF THE DISCLOSURE

The present disclosure relates generally to operation of vehicle transmissions.

BACKGROUND OF THE DISCLOSURE

A vehicle transmission functions to transfer power from a power source, such as an engine, to a driveshaft to power a vehicle. The transmission is operable to alter a speed and torque applied to the driveshaft in relation to engine speed and torque.

SUMMARY OF THE DISCLOSURE

A first aspect of the present disclosure is directed to a system for pressuring a fluid used to perform an operation of a transmission. The system may include a source of a pressurized first fluid and an accumulator in fluid communication with the pressurized first fluid. The accumulator may contain a gas that is compressible in response the pressurized first fluid. A second fluid may be flowable from the accumulator in response to the compressed gas to a transmission to facilitate an operation of the transmission.

A second aspect of the present disclosure is directed to a method of operating a transmission. The method may include compressing a gas in an accumulator to a selected pressure with a first fluid; pressurizing a second fluid with the compressed gas; applying the pressurized second fluid to the transmission; and operating the transmission with the pressurized second fluid.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

Figure 1:
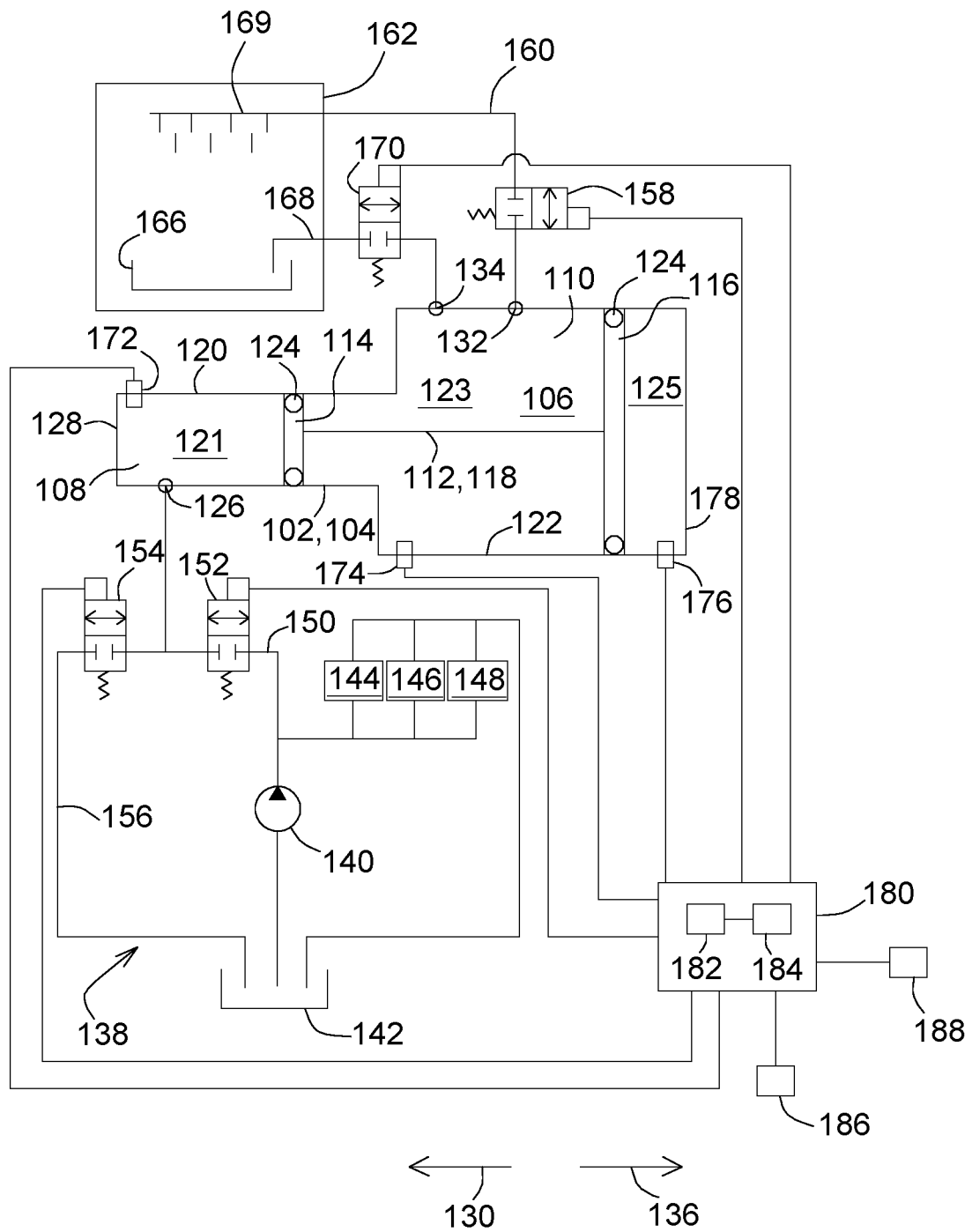
FIG. 1 is a schematic diagram of an example system used to provide hydraulic pressure selectively to operate a function of a machine, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to systems, methods, and apparatuses for operating a transmission using energy stored in a compressed gas. Particularly, the energy stored in the compressed gas pressurizes a fluid, such as transmission fluid, which is used to effectuate shifting of the transmission. The gas is compressed with another fluid that is different from the fluid used to operate the transmission, and the two fluids are prevented from mixing. However, the scope of the disclosure and the applicability there of is not limited to transmission and the operation of transmissions. Rather, the disclosure encompasses operations of other types of machines, such as braking systems. Consequently, although the following description is made in the context of transmissions and the operation thereof, such as shifting of the transmission, the scope of the disclosure is not limited thereto.

Particularly, the present disclosure provides for an accumulator that provides fluidic pressure used to actuate a machine, such as a clutch of a transmission to perform a shifting operation. The accumulator avoids the use of a separate, continuously operating pump. Because actuation of the machine may be intermittent, such a pump results in inefficiency, excessive fuel consumption, and the generation of heat.

FIG. 1 is a schematic view of an example system 100 that functions to operate a transmission. The system 100 is a pneumatic-hydraulic system that utilizes a first fluid to pressurize a second fluid that is used to operate the transmission. The first fluid may be system hydraulic oil that is used to operate one or more other systems of a machine, such as one or more hydraulic systems of a vehicle. System hydraulic oil may be used to operate one or more drive systems for performing work. For example, the system hydraulic oil may be used to operate one or more actuators, a hydraulic motor-pump, or any other type of hydraulic system of the vehicle, such as an agricultural vehicle, a construction vehicle, or a forestry vehicle. However, other types of vehicles or machines that utilize a transmission are also within the scope of the present disclosure.

The system 100 includes an accumulator 102. The accumulator 102 includes a body 104 that defines an interior cavity 106. The interior cavity 106 includes a first portion 108 and a second portion 110. The first portion 108 has a first cross sectional size, and the second portion 110 has a second cross-sectional size that is larger than the first cross-sectional size. In some implementations, the interior cavity 106 may be cylindrical. For example, in some implementations, the cross-sectional shapes of the first portion 108, the second portion 110, or both may be circular. In other implementations, the cross-sectional shapes of the first portion 108 or the second portion 110 or both may be in the form of a polygon, an ellipse, or any other desired shape. Further, in some implementations, the cross-sectional shapes of the first portion 108 and the second portion 110 may correspond to one another, while, in other implementations, the cross-sectional shapes of the first portion 108 and the second portion 110 may be different.

A movable piston 112 is disposed within the interior cavity 106. The piston 112 is moveable in response to pressure changes within the interior cavity 106. The piston 112 includes a first end portion 114 disposed in the first portion 108 of the interior cavity 106, and a second end portion 116 is disposed in the second portion 110 of the interior cavity 106. The first end portion 114 and the second end portion 116 are connected by a connector 118. The connector 118 may be a shaft, a rod, or other component that couples the first end portion 114 and the second end portion 116. The end portions 114 and 116 of the piston 112 conform to interior surfaces 120 and 122 of the first and second portions 108 and 110, respectively, of the interior cavity 106 to form seals. The seals form barriers within the interior cavity 106 that avoid mixing of fluids on opposing sides of each of the first end portion 114 and the second end portion 116. In some implementations, a sealing component 124 is disposed along a perimeter of each of the first and second end portions 114 and 116. The sealing components 124 conform to the interior surfaces 120 and 122 to avoid mixing of fluids disposed on opposing sides of each of the first end portion 114 and the second end portion 116.

A cross-sectional size of each of the first end portion 114 and the second end portions 116, a stroke of the piston 112 within the reservoir, and a pressure of a gas within the interior cavity 106 (described in more detail below) may be selected to be any desired value to provide, for example, operation at a desired pressure and to provide a selected number of actuations of the accumulator 102. An actuation of the accumulator 102 may result in an operation of a machine, such as a shifting operation of a transmission. In implementations where the first and second end portions 114 and 116 are circular, a diameter of each of the first and second end portions 114 and 116 may be selected or provide a desired level of performance as explained above, for example.

The piston 112 divides the interior cavity 106 into three segments. A first segment 121 is formed between the first end portion 114 of the piston 112 and an end wall 128 of the body 104. A second segment 123 is formed between the first end portion 114 of the piston 112 and the second end portion 116 of the piston 112. A third segment 125 is formed between the second end portion 116 of the piston 112 and a second end wall 178 of the body 104. Volumes defined by each of the segments 121, 123, and 125 change as the piston 112 moves within the interior cavity 106.

A first opening 126 is formed in the body 104 at the first portion 108 of the interior cavity 106 to permit the inflow and outflow of fluid into and out from the first portion 108. In some implementations, two openings may be formed in the body 104 at the first portion 108. One of the openings may be used to conduct fluid into the first portion 108, and the second opening may be used to conduct fluid out of the first portion 108. The first opening 126 (or both openings when multiple openings are used to conduct fluid into and out of the first portion 108) is formed in the body 104 at a location to provide fluid communication with the first segment 121 of the interior cavity 106. The location of the first opening 126 is selected such that fluid communication is maintained with the first segment 121 regardless of the position of the piston 112 during operation of the system 100, such as when the piston 112 has been fully displaced in the direction of arrow 130 during the course of operation of the system 100.

A second opening 132 and a third opening 134 are formed in the body 104 and provide fluid communication with the interior cavity 106. The second and third openings 132 and 134 provide fluid communication with second segment 123. The second and third openings 132 and 134 may be formed at locations in the body 104 along the first portion 108 or the second portion 110 of the interior cavity 106 so long as the second and third openings 132 and 134 maintain fluid communication with the second segment 123 during operation of the system 100. For example, locations of the second and third openings 132 and 134 maintain fluid communication with the second segment 123 even when the piston 112 is at a fully displaced position in the direction of arrow 130 or 136 during the course of operation of the system 100.

A hydraulic system 138 is fluidically coupled to the accumulator 102 at the first opening 126. The hydraulic system 138 may be a hydraulic system that is used to operate various components of a vehicle, such as an agricultural vehicle, a construction vehicle, or a forestry vehicle, or another type of machine. Other types of vehicles are also within the scope of the present disclosure. The various components may include hydraulic actuators, motor-generators, or other components that operate using hydraulic fluid. In some implementations, the hydraulic system 138 includes a pump 140 that draws hydraulic fluid from a reservoir 142 and distributes the pressurized hydraulic fluid to various hydraulic components 144, 146, and 148. Hydraulic fluid is returned from the hydraulic components 144, 146, and 148 to the reservoir 142. Although three hydraulic components are illustrated, additional or fewer hydraulic components may be included. The pressurized hydraulic fluid is also conducted to the first opening 126 formed in the body 104.

The pressurized fluid passes through a feed line 150. A first valve 152 is disposed in the feed line 150. In the illustrated example, the first valve 152 is a two-position, solenoid operated valve. In other implementations, other types of valves may be used. The first valve 152 has a default closed position and an open position. In the default closed position, the first valve 152 prevents passage of the pressurized hydraulic fluid and, thus, prevents the pressurized hydraulic fluid from entering the first portion 108 of the interior cavity 106. In the open position, the first valve 152 permits passage of the pressurized hydraulic fluid into the first portion 108 of the interior cavity 106. Hydraulic fluid from the hydraulic system 138 is referred to as a "first fluid." The first fluid occupies the first segment 121 of the interior cavity 106. As explained earlier, a volume of the first segment 121 changes in response to movement of the piston 112.

A second valve 154 is disposed in a return line 156 that directs hydraulic fluid back to the reservoir 142. In the illustrated example, the second valve 154 is a solenoid-operated, two position valve. In other implementations, other types of valves may be used. The second valve 154 has a default closed position and an open position. In the default closed position, hydraulic fluid is prevented from flowing from the first portion 108 of the interior cavity 106 into the return line 156 and returning to the reservoir 142. In the open position, the second valve 154 permits passage of hydraulic fluid from the first portion 108 of the interior cavity 106 to the return line 156 and back to the reservoir 142.

The hydraulic fluid that occupies the second segment 123 is referred to as a "second fluid." In some implementations, the second fluid that occupies the second segment 123 in the hydraulic system 138 may be a hydraulic oil, such as hydraulic transmission oil. In some implementations, the first fluid and the second fluid may be different fluids. In other implementations, the first fluid and the second fluid may be the same type of fluid. However, notwithstanding the nature of the first and second fluids, the first end portion 114 of the piston acts as a barrier so that the first fluid and the second fluid are prevented from mixing within the interior cavity 106.

A third valve 158 is disposed in a line 160 that conducts the second fluid from the interior cavity 106 to a transmission 162. In the illustrated example, the third valve 158 is a solenoid-operated, two position valve. In other implementations, other types of valves may be used. The third valve 158 has a default closed position and an open position. In the default closed position, the third valve 158 prevents passage of second fluid from the second segment 123 of the interior cavity 106 to the transmission 162. In the open position, the third valve 158 permits passage of the second fluid to the transmission 162 from the second segment 123 of the interior cavity 106. The second fluid transported to the transmission 162 via the line 160 is used to perform an operation of the transmission 162. For example, the second fluid may be used to operate the clutch 164, such as during shifting of gears of the transmission 162. In other implementations, the second fluid conducted from the second segment 123 of the interior cavity 106 via the second opening 132 may be directed to another type of device to perform an operation of the device.

In the illustrated example, the second fluid transported to the clutch 164 is used during operation of the clutch, and the second fluid is collected in a reservoir 166. A line 168 is used to return second fluid collected in the reservoir 166 back to the second segment 123 of the interior cavity 106 via the third opening 134. A fourth valve 170 is disposed along the line 168. In the illustrated example, the fourth valve 170 is a solenoid-operated, two position valve. In other implementations, other types of valves may be used. The fourth valve 170 has a default closed position and an open position. In the default closed position, the fourth valve 170 prevents second fluid from flowing from the reservoir 166, though the third opening 134, and into the interior cavity 106 via the line 168. In the open position, the fourth valve 170 permits passage of the second fluid from the reservoir 166 to the interior cavity 106.

Although the accumulator 102 includes two openings, i.e., openings 132 and 134, to conduct fluid to and from the transmission 162, in other implementations, the lines 160 and 168 may be in fluid communication with the second segment 123 via a single opening. In such implementations, the valves 158 and 170 may be operated in a manner similar to that described above with respect to the accumulator 102 of FIG. 1 to control fluid flow into and out of the second segment 123.

Three pressure sensors are used to measure pressures within the interior cavity 106. A first pressure sensor 172 senses a pressure of the first fluid within the first segment 121. A location in the body 104 where the first pressure sensor 172 is situated is selected such that a pressure of the first fluid is detectable by the first pressure sensor 172 regardless of a position of the piston 112 during operation of the system 100. For example, the location in the body 104 where the first sensor 172 senses the fluid pressure of the first fluid is selected to be exposed to the first fluid even when the piston 112 is fully displaced in the direction of arrow 130 during operation of the system 100. In the illustrated example, the first pressure sensor 172 is coupled to the body 104 and extends into the first portion 108 of the interior cavity 106. In other implementations, other configurations may be used. For example, in some implementations, the first pressure sensor 172 may be flush with an interior surface of the body 104 and, therefore, not extend into the interior cavity 106.

The second sensor 174 senses a pressure of the second fluid in the second segment 123. A location in the body 104 where the second pressure sensor 174 senses pressure of the second fluid is selected such that the second sensor 174 is able to sense the pressure of the second fluid regardless of the position of the piston 112 during operation of the system 100. In the illustrated example, the second pressure sensor 174 is coupled to the body 104 and extends into the second portion 110 of the interior cavity 106. In other implementations, other configurations may be used. For example, in some implementations, the second pressure sensor 174 may be flush with an interior surface of the body 104 and, therefore, not extend into the interior cavity 106.

A third pressure sensor 176 senses a pressure of a gas contained in the third segment 125. In some implementations, nitrogen gas may be used. In other dry air may be used. In still other implementations, other gases or mixtures of gases may be used. A location in the body 104 where the third pressure sensor 176 senses pressure of the gas is selected such that a pressure of the gas is detectable notwithstanding a position of the piston 112 during operation of the system 100. In the illustrated example, the third pressure sensor 176 is coupled to the body 104 and extends into the third portion 125 of the interior cavity 106. In other implementations, other configurations may be used. For example, in some implementations, the third pressure sensor 176 may be flush with an interior surface of the body 104 and, therefore, not extend into the interior cavity 106. The gas contained in the third segment 125 is introduced into the interior cavity 106 and compressed to a selected pressure. The gas may be compressed by the piston 112 in response to introduction of the first fluid into the first segment 121.

Any or all of the first, second, or third pressure sensors 172, 174, or 176 may be coupled to the body 104 and may be in contact with the respective fluids, whether a liquid or gas. In other implementations, any or all of the first, second, or third pressure sensors 172, 174, or 176 may be remotely located from the body 104 and coupled to the body via a conduit.

Figure 4:
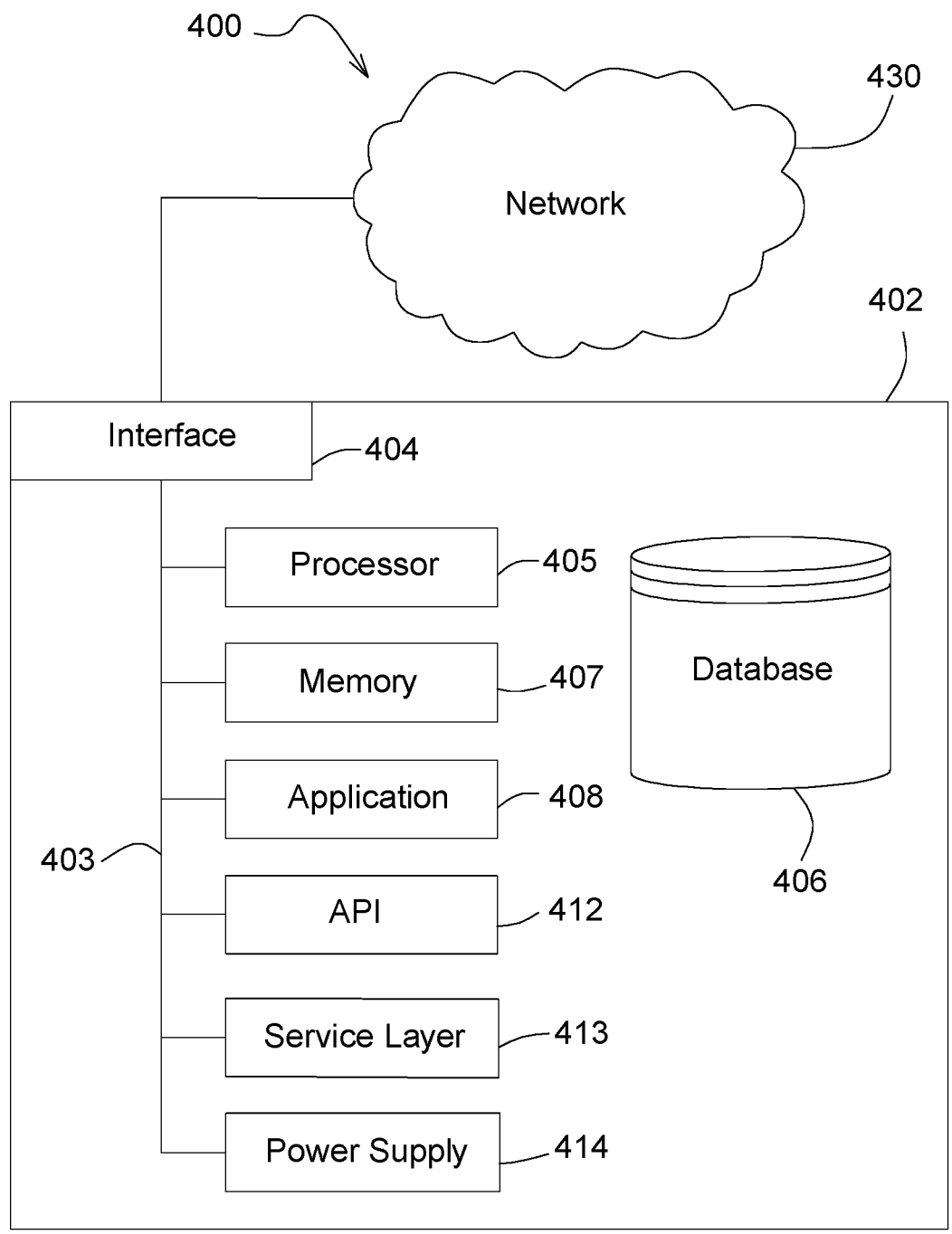
FIG. 4 is a block diagram illustrating an example computer system used to provide computational functionalities associated with described algorithms, methods, functions, processes, flows, and procedures as described in the present disclosure, according to some implementations of the present disclosure.

The system 100 also includes a controller 180. In some implementations, the controller 180 is an electronic computer system that operates to control various aspects of the system 100 based on received information. Particularly, in the illustrated example, the controller 180 receives signals, such as from the pressure sensors 172, 174, and 176, and sends signals to control components of the system 100, such as to actuate the valves 152, 154, 158, and 170. The controller 180 may be of a type of computer system 400 described below and as illustrated in FIG. 4. The controller 180 includes a memory 182 and a processor 184. Although the memory 182 is shown as being included in the controller 180, in some implementations, the memory 182 may be separate from the controller 180 and communicably coupled to the controller 180 via a wired or wireless connection. For example, in some implementations, the memory 182 may be remotely located.

The memory 182 communicates with the processor 184 and is used to store software and information (such as in the form of data). The processor 184 is operable to execute programs and receive information from and send information to the memory 182. Although a single memory 182 and a single processor 184 are illustrated, in other implementations, a plurality of memories, processors, or both may be used. A display 186 is coupled to the controller 180. The display 186 may be used to present information to a user or, where the display includes a touch screen, the display 186 may be used as an input device. The display 186 may include a graphical user interface, described in more detail below, that allows a user to interface with applications executed by the processor 184. An input device 188 is also coupled to the controller 180. A user may use the input device 188 to input information into the controller 180. The memory 182 stores programs, such as application 186, and other information 188 (such as in the form of data).

The controller 180 controls operation of the system 100, such as actuation of the valves 152, 154, 158, and 170, based, at least in part, on sensed information provided by the pressure sensors 172, 174, and 176. Example operation of the system 100 is described in more detail below.

Figure 2:
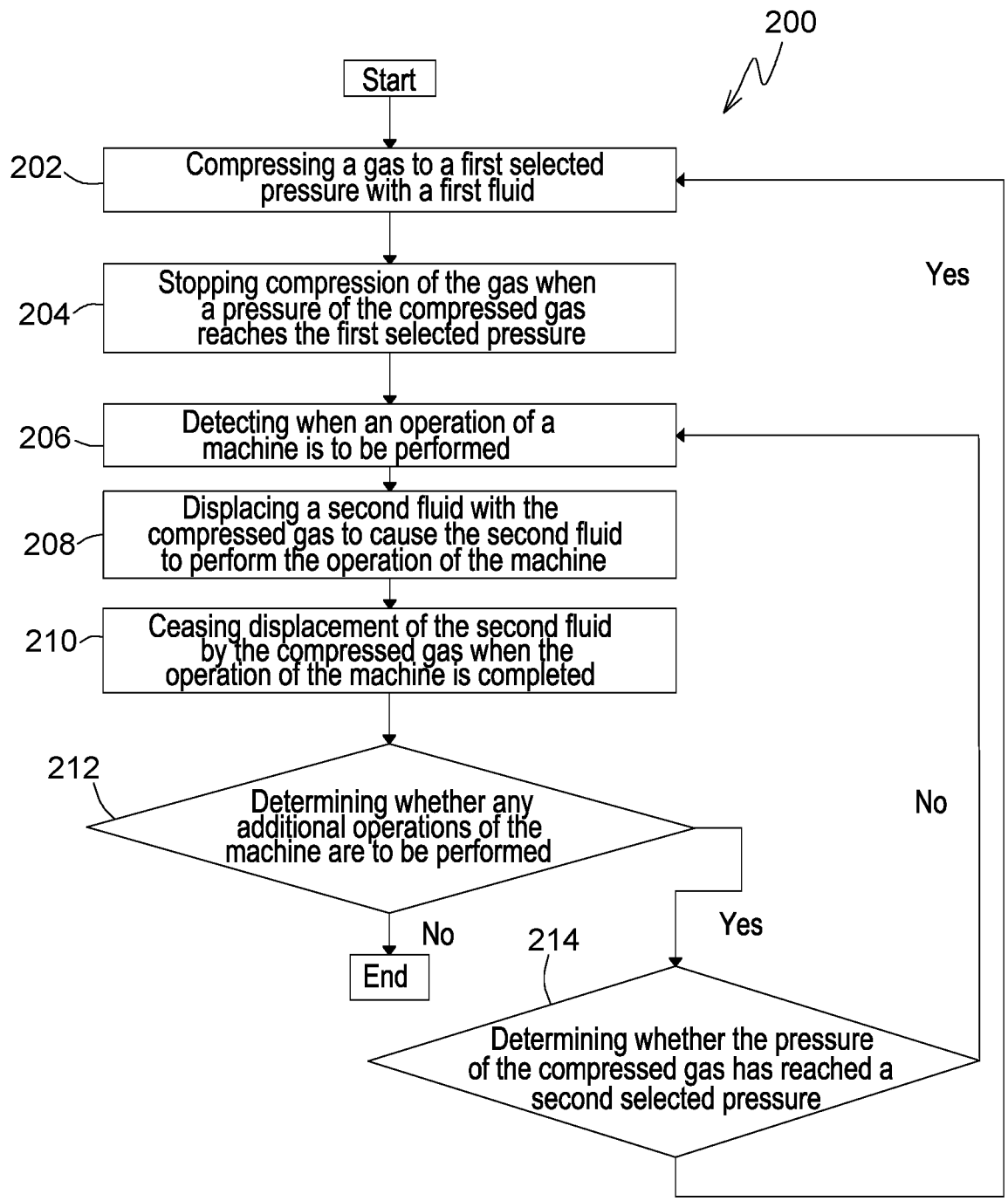
FIG. 2 is a flow chart of an example method for using an accumulator to perform an operation of a machine, according to some implementations of the present disclosure.

FIG. 2 is a flow chart of an example method 200 for using an accumulator to perform an operation of a machine. In this example, the method 200 is directed to performing shifting operations of the transmission using an accumulator. In the course of describing the method 200 reference may be made to the example system 100 and parts thereof. The scope of the disclosure, though, is not so limited. Rather, the method 200 may be applicable to any system within the scope of the present disclosure. Thus, system configurations other that the configuration of example system 100 may be used and are within the scope of the present disclosure.

Prior to operation, the gas in the third segment 125 is compressed to a selected pre-charge pressure. The pre-charge pressure of the gas corresponds to a selected position of the piston 112, such as a position of the second end portion 116, along a length of the body 104. At 202, the gas is compressed to a first selected pressure. The first selected pressure exceeds the pre-charge gas pressure. The selected pressure may be selected to provide the second fluid with enough energy to perform a selected number of shifting operations of the transmission before re-pressurizing the gas is needed. For example, the gas may be compressed by the first fluid to a selected pressure that provides five to 10 shifting operations. In other implementations, the selected pressure may provide for additional or fewer shifting operations.

The gas is compressed using the first fluid, which, in some implementations, may be system hydraulic oil. In some implementations, the first fluid may have a pressure in the range of 3000 pounds per square inch (psi) (20.7 megapascals (MPa)) to 3600 psi (24.8 MPa). However, this pressure range is provided merely as an example. In other implementations, other pressure ranges may be used. With reference to FIG. 1, the first valve 152 is placed in the open position with the second valve 154 maintained in the closed position. As a result, the first fluid passes into the first segment 121 via the first opening 126. The third valve 158 is maintained in the closed position, and the fourth valve 170 is moved into the open position. As a result, the piston 116 is displaced in the direction of arrow 136 in response to introduction to the pressurized first fluid into the first segment 121, which draws of the second fluid from the reservoir 166 into the second segment 123 via the open fourth valve 170 and the third opening 134. The piston 112 compresses the gas to the selected pressure. In some implementations, the gas may be compressed to a pressure within n a range of 250 psi (1.72 MPa) to 450 psi (3.10 MPa). However, this pressure range is provided merely as an example. In other implementations, the pressure range may extend to pressures lower than 250 psi (1.72 MPa) or greater than 450 psi (3.10 MPa). Further, a pressure to which the gas is compressed may be selected based on, for example, a number of operations of a machine to be performed using the energy stored in the compressed gas. For example, where the second fluid is used to perform a shifting operation of a transmission, a consideration that may be used to determine the first selected pressure to which the gas is compressed may be the number of shifts to be performed by the transmission using the second fluid and energy stored in the compressed gas before the compressed gas has obtained a second selected pressure. The second selected pressure may correspond to a pressure at which the gas has insufficient energy to effectuate a further shift or a pressure level selected to cause the gas to be re-pressurized to the first selected pressure.

At 204, compression of the gas is stopped when the pressure of the compressed gas reaches the first selected pressure. The third sensor 176 senses the pressure of the compressed gas and transmits the information to the controller 180. When the sensed pressure from the third sensor 176 reaches the selected pressure, the controller 180 closes the first valve 152 and opens the second valve 154. As a result, the pressure applied to the first fluid contained in the first segment 121 is removed, stopping movement of the piston 112 in the direction of arrow 136. Additionally, with the second valve 154 open, the first fluid is permitted to drain back to the reservoir 142. The controller 180 also closes the fourth valve 170 when the sensed pressure of the compressed gas reaches the selected pressure. Closing the fourth valve 170 prevents movement of the piston 112 in the direction of arrow 130 until shifting of the transmission is desired.

At 206, when an operation of a machine is to be performed is detected. In the present example, the machine is a transmission, and the operation is shifting of the transmission. For example, the controller 180 may receive a signal from the transmission 162 or from another source indicating a shift is to be performed. For example, the transmission may be a part of a vehicle, and a signal to shift the transmission may be received by the controller 180 from sensor of the vehicle, another computer of the vehicle, a user input (such as a user input to the vehicle), or another source whether onboard the vehicle or external to the vehicle.

At 208, a second fluid is displaced with the compressed gas to cause the second fluid to perform the operation of the machine. In this example, when an indication that a shifting operation is to be performed is received by the controller 180, the controller 180 opens the third valve 158, permitting the second fluid to flow through the line 160. With the third valve 158 in the open position, the compressed gas contained in the third segment 125 expands, displacing the piston 112 in the direction of arrow 130, forcing a portion of the second fluid contained in the second segment 123 into the line 160 and to the clutch 164, enabling the clutch 164 to operate and shift a gear of the transmission 162. The amount of second fluid used to operate the clutch 164 is collected in the reservoir 166 after use. The second fluid contained in the reservoir 166 is used to refill the second segment 123 when the gas is re-pressurized.

At 210, displacement of the second fluid by the compressed gas is ceased when the operation of the machine is completed. Thus, in the present example, the controller 180 may receive a signal from the transmission 162 or from another source, as described earlier, that indicates the shifting of the transmission 162 is completed. In response, the controller 180 sends a signal to the third valve 158 to move the third valve 158 into the closed position. As a result, expansion of the gas and, correspondingly, movement of the piston 112 in the direction of arrow 130 is ceased. In some implementations, an amount of energy of the compressed gas used to shift the transmission is less than a total amount stored in the compressed gas. Therefore, in some implementation, the energy contained in the compressed gas may be used to perform a plurality of shifting before the gas is recompressed with the first fluid.

At 212, a determination is made as to whether any additional operations of the machine is to be performed. For example, in the context of a transmission of a vehicle, if the vehicle maintains in operation, e.g., if an engine of the vehicle continues to operate, additional shift of the transmission may occur. Therefore, if additional operations of the machine are to be performed, e.g., if additional shifts of the transmission are likely to occur in the future, then the method 200 moves to 214. If no additional operations are to be performed, then the method 200 ends.

At 214, a determination is made as to whether the pressure of the compressed gas has reached a second selected pressure. In the context of the described example, the controller 180 may receive signals from the third pressure sensor 176 indicative of the pressure of the gas. In some implementations, the pressure signal may be continuous or sampled at a selected frequency. The controller 180 compares the received pressure signal and compares the received pressure signal to a second selected pressure. When the pressure of the gas reaches or drops below the second selected pressure, the controller 180 operates the system 100 to re-pressurize the compressed gas. If the pressure signal is above the second selected pressure, re-pressurization of the compressed gas is not needed. The second selected pressure is less than the first selected pressure. In some implementations, the second selected pressure is greater than the pre-charge gas pressure.

If the result of 214 is "no," i.e., the pressure of the compressed gas is not at or below the second selected pressure, then the method 200 returns to 206, and the method 200 continues as described above. If the result of 214 is "yes," i.e., the pressure of the compressed gas is at or below the second selected pressure, the method returns to 202, where the gas is re-pressurized by the first fluid as discussed above. Particularly, in the context of the present example, to re-pressurize the gas, the controller 180 sends a signal to the second valve 154 to move into the closed position, a signal to the first valve 152 to move into the open position, and a signal to the fourth valve 170 to move into the open position. As described above, the pressurized first fluid is conducted into the first segment 121 via the line 150, displacing the piston 112 in the direction of arrow 136, drawing the second fluid into the second segment 123 via line 168, and compressing the gas in the third segment 125.

Figure 3:
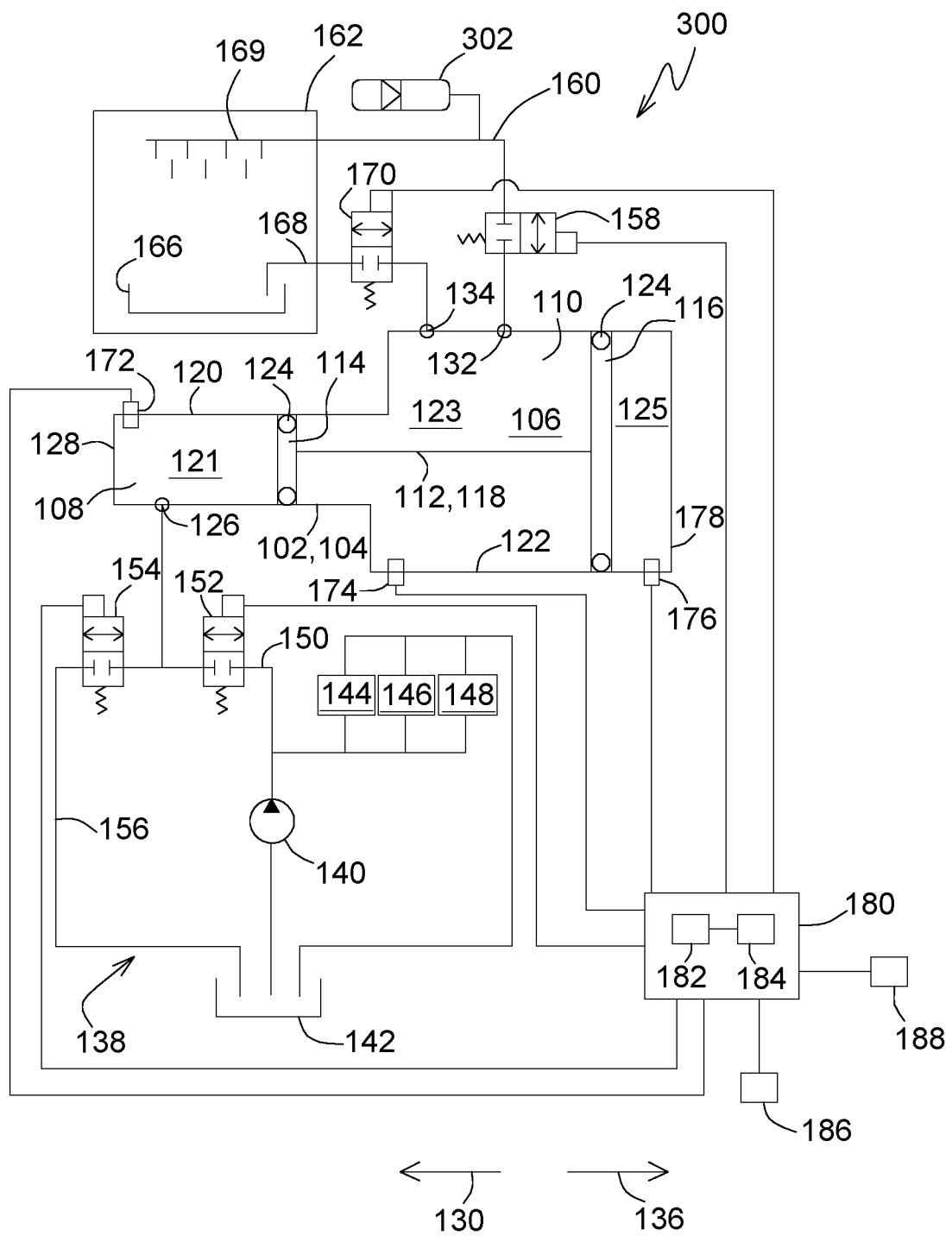
FIG. 3 is a schematic diagram of another example system used to provide hydraulic pressure selectively to operate a function of a machine, according to some implementations of the present disclosure.

FIG. 3 is another example system 300 that uses an accumulator to operate a function of a transmission. Components of the system 300 that are identical to those of the system 100 are identified with the same corresponding reference numbers used in FIG. 1. The system 300 is identical to the system 100 of FIG. 1 except that a second accumulator 302 is in fluid communication with line 160 is included. The second accumulator 302 is sized and operates to provide a volume of the second fluid to the clutch 164 of the transmission 162 to perform a shifting operation when the gas in the third segment 125 of the first accumulator 102 is undergoing re-pressurization. As a result, shifting of the transmission is able to be performed when the first accumulator is otherwise unavailable to transfer the second fluid to the transmission 162 due to the gas being re-pressurized by the first fluid. Thus, the second accumulator 302 avoids a delay in shifting of the transmission when the gas in the first accumulator 102 is being re-pressurized. Further, the second accumulator 302 may be sized to be operable to perform a plurality of shifting operations before being recharged. The second accumulator 302 is recharged by the second fluid displaced by the first accumulator 102 during operation of the first accumulator 102.

Still further, the second accumulator 302 may provide a pressure source used to gradually reduce pressure of the second fluid (referred to as a gradual "leak down"). For example, the hydraulic components extending between the first accumulator 102 and the transmission 162, which may include the transmission 162 itself, may cause a reduction in fluid pressure over time. Such a pressure reduction may be the result of imperfect sealing, such as seals formed by O-rings, for example. Therefore, the second accumulator 302 provides a pressure level that maintains within these hydraulic components between shifting operations of the transmission 162.

FIG. 4 is a block diagram of an example computer system 400 used to provide computational functionalities associated with described algorithms, methods, functions, processes, flows, and procedures described in the present disclosure, according to some implementations of the present disclosure. The illustrated computer 402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. Also, the computer 402 can include output devices that can convey information associated with the operation of the computer 402. The information can include digital data, visual data, audio information, or a combination of information. The information can be presented in a graphical user interface (UI) (or GUI).

The computer 402 can serve in a role as a client, a network component, a server, a database, a persistency, or components of a computer system for performing the subject matter described in the present disclosure. The illustrated computer 402 is communicably coupled with a network 430. In some implementations, one or more components of the computer 402 can be configured to operate within different environments, including cloud-computing-based environments, local environments, global environments, and combinations of environments.

At a high level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 430 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus 403. In some implementations, any or all of the components of the computer 402, including hardware or software components, can interface with each other or the interface 404 (or a combination of both), over the system bus 403. Interfaces can use an application programming interface (API) 412, a service layer 413, or a combination of the API 412 and service layer 413. The API 412 can include specifications for routines, data structures, and object classes. The API 412 can be either computer-language independent or dependent. The API 412 can refer to a complete interface, a single function, or a set of APIs.

The service layer 413 can provide software services to the computer 402 and other components (whether illustrated or not) that are communicably coupled to the computer 402. The functionality of the computer 402 can be accessible for all service consumers using this service layer. Software services, such as those provided by the service layer 413, can provide reusable, defined functionalities through a defined interface. For example, the interface can be software written in JAVA, C++, or a language providing data in extensible markup language (XML) format. While illustrated as an integrated component of the computer 402, in alternative implementations, the API 412 or the service layer 413 can be stand-alone components in relation to other components of the computer 402 and other components communicably coupled to the computer 402. Moreover, any or all parts of the API 412 or the service layer 413 can be implemented as child or sub-modules of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402 and the described functionality. The interface 404 can be used by the computer 402 for communicating with other systems that are connected to the network 430 (whether illustrated or not) in a distributed environment. Generally, the interface 404 can include, or be implemented using, logic encoded in software or hardware (or a combination of software and hardware) operable to communicate with the network 430. More specifically, the interface 404 can include software supporting one or more communication protocols associated with communications. As such, the network 430 or the interface's hardware can be operable to communicate physical signals within and outside of the illustrated computer 402.

The computer 402 includes a processor 405. Although illustrated as a single processor 405 in FIG. 4, two or more processors 405 can be used according to particular needs, desires, or particular implementations of the computer 402 and the described functionality. Generally, the processor 405 can execute instructions and can manipulate data to perform the operations of the computer 402, including operations using algorithms, methods, functions, processes, flows, and procedures as described in the present disclosure.

The computer 402 also includes a database 406 that can hold data for the computer 402 and other components connected to the network 430 (whether illustrated or not). For example, database 406 can be an in-memory, conventional, or a database storing data consistent with the present disclosure. In some implementations, database 406 can be a combination of two or more different database types (for example, hybrid in-memory and conventional databases) according to particular needs, desires, or particular implementations of the computer 402 and the described functionality. Although illustrated as a single database 406 in FIG. 4, two or more databases (of the same, different, or combination of types) can be used according to particular needs, desires, or particular implementations of the computer 402 and the described functionality. While database 406 is illustrated as an internal component of the computer 402, in alternative implementations, database 406 can be external to the computer 402.

The computer 402 also includes a memory 407 that can hold data for the computer 402 or a combination of components connected to the network 430 (whether illustrated or not). Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 (of the same, different, or combination of types) can be used according to particular needs, desires, or particular implementations of the computer 402 and the described functionality. While memory 407 is illustrated as an internal component of the computer 402, in alternative implementations, memory 407 can be external to the computer 402.

The application 408 can be an algorithmic software engine providing functionality according to particular needs, desires, or particular implementations of the computer 402 and the described functionality. For example, application 408 can serve as one or more components, modules, or applications. Further, although illustrated as a single application 408, the application 408 can be implemented as multiple applications 408 on the computer 402. In addition, although illustrated as internal to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion and management circuits, including recharging, standby, and power management functionalities. In some implementations, the power-supply 414 can include a power plug to allow the computer 402 to be plugged into a wall socket or a power source to, for example, power the computer 402 or recharge a rechargeable battery.

There can be any number of computers 402 associated with, or external to, a computer system containing computer 402, with each computer 402 communicating over network 430. Further, the terms "client," "user," and other appropriate terminology can be used interchangeably, as appropriate, without departing from the scope of the present disclosure. Moreover, the present disclosure contemplates that many users can use one computer 402 and one user can use multiple computers 402.

Described implementations of the subject matter can include one or more features, alone or in combination.

For example, in a first implementation, a computer-implemented system, including one or more processors and a non-transitory computer-readable storage medium coupled to the one or more processors and storing programming instructions for execution by the one or more processors, the programming instructions instructing the one or more processors to: compress a gas in an accumulator to a selected pressure with a first fluid; pressurize a second fluid with the compressed gas; apply the pressurized second fluid to the transmission; and operate the transmission with the pressurized second fluid.

The foregoing and other described implementations can each, optionally, include one or more of the following features:

A first feature, combinable with any of the following features, wherein the programming instructions instructing the one or more processors to pressurize a gas in an accumulator to a selected pressure with a first fluid include programming instructions instructing the one or more processors to: introduce the first fluid into a first portion of the accumulator; and displace a piston within the accumulator to pressurize the gas contained in a second portion of the accumulator.

A second feature, combinable with any of the previous or following features, wherein the piston comprises a first end disposed in the first portion of the accumulator and a second end disposed in the second portion of the accumulator.

A third feature, combinable with any of the previous or following features, wherein the second fluid is disposed between the first end of the piston and the second end of the piston.

A fourth feature, combinable with any of the previous or following features, the method including programming instructions to instruct the one or more processors to reduce a pressure of the first fluid when the gas is compressed to the selected pressure.

A fifth feature, combinable with any of the previous or following features, wherein the programming instructions to instruct the one or more processors to apply the pressurized second fluid to the transmission includes programming instructions to cause the one or more processors to open a valve and flow the pressurized second fluid through the open valve to the transmission to operate the transmission in response to displacement of the piston by the compressed gas.

A sixth feature, combinable with any of the previous or following features, wherein the selected pressure is selected to accommodate a selected number of operations of the transmission before recompression of the gas is performed.

A seventh feature, combinable with any of the previous or following features, wherein the programming instructions to instruct the one or more processors to compress a gas in an accumulator to a selected pressure with a first fluid includes programming instructions to instruct the one or more processors to flow the second fluid into a portion of an interior cavity of the accumulator formed between a first end of a piston disposed in the interior cavity and a second end of the piston as the gas is compressed by the first fluid.

An eighth feature, combinable with any of the previous or following features, wherein the first fluid is system hydraulic fluid and wherein the second fluid is transmission.

A ninth feature, combinable with any of the previous features, wherein the computer programming instructions to instruct the one or more processor to operate the transmission with the pressurized second fluid includes programming instruction to instruct the one or more processors to shift the transmission.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Without in any way limiting the scope, interpretation, or application of the claims appearing below, a technical effect of one or more of the example implementations disclosed herein is to provide actuation of a machine, such as a transmission, while avoiding energy losses associated with a continuously operating pump that would otherwise be used to facilitate the actuation.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A system for pressurizing a fluid used to perform an operation of a machine, the system comprising:
    a source of a pressurized first fluid; and
    an accumulator in fluid communication with the pressurized first fluid, the accumulator containing a gas that is compressible in response to the pressurized first fluid, a second fluid flowable from the accumulator in response to the compressed gas to a machine to facilitate an operation of the machine,
    wherein the accumulator comprises:
        a body defining an interior cavity; and
        a piston disposed in the interior cavity and movable therein, the piston dividing the interior cavity into a first segment in fluid communication with the pressurized first fluid, a second segment in fluid communication with the second fluid, and a third segment that contains the compressed gas,
    wherein the interior cavity comprises:
        a first portion defining a first cross-sectional size, the first cross-sectional size corresponding to a first cross-section that is perpendicular to a direction of movement of the piston within the interior cavity; and
        a second portion opposite the first portion defining a second cross-sectional size greater than the first cross-sectional size, the second cross-sectional size corresponding to a second cross-section that is perpendicular to the direction of movement of the piston,
    wherein the piston comprises a first end portion disposed in the first portion of the interior cavity, and
    wherein the piston comprises a second end portion disposed in the second portion of the interior cavity.

2. The system of claim 1, wherein the body comprises a first end wall and a second end wall,
    wherein the first segment is formed between the first end wall and the first end portion of the piston, wherein the second segment is formed between the first end portion of the piston and the second end portion of the piston, and wherein the third segment is formed between the second end wall and the second end portion of the piston.

3. The system of claim 1, wherein the first segment is in fluid communication with the source of the pressurized first fluid.

4. The system of claim 1, wherein the second segment is in fluid communication with the second fluid.

5. The system of claim 1, further comprising a first opening formed in the body providing fluid communication between the first segment and the source of the pressurized first fluid, the first fluid being conducted into the first segment of the interior cavity via the first opening to displace the piston in a first direction to compress the gas.

6. The system of claim 5, wherein the machine is a transmission, and wherein the system further comprises:
    a second opening formed in the body and in fluid communication with the second segment of the interior cavity, the second opening being in fluid communication with a reservoir containing the second fluid, the second fluid flowable from the reservoir into the second segment through the second opening in response to movement of the piston in response to the pressurized first fluid; and
    a third opening formed in the body and in fluid communication with the second segment of the interior cavity, the third opening in fluid communication with a clutch of the transmission, the second fluid pressurized by the compressed gas flowable to the clutch via the third opening in response to movement of the piston in a second direction opposite the first direction to facilitate operation of the clutch.

7. The system of claim 1, wherein the first fluid has a pressure greater than the compressed gas to compress the compressed gas to a selected pressure.

8. The system of claim 1, wherein the first fluid is conducted out of the first segment of the interior cavity via a first opening when the compressed gas is compressed to a selected pressure.

9. The system of claim 1, wherein the first fluid is prevented from mixing with the second fluid.

10. The system of claim 1, wherein the first end portion of the piston forms a seal between the first segment and the second segment that prevents mixing of the first fluid and the second fluid.

11. The system of claim 1, wherein the first fluid is received into the first segment of the interior cavity via a first opening to pressurize the compressed gas and wherein the first fluid is drained from the first segment of the interior cavity during expansion of the compressed gas.

12. The system of claim 11, wherein the first fluid is introduced into the first segment at a pressure greater than the compressed gas such that the first fluid displaces the piston in a first direction to compress the compressed gas to a selected pressure, wherein a second opening into the interior cavity is in an open configuration as the piston is displaced in a second direction, opposite the first direction, the second fluid being expelled from the second segment of the interior cavity via the second opening in response to movement of the piston in the second direction, and wherein a third opening into the interior cavity is in a closed configuration when the piston is moved in the second direction.

13. The system of claim 12, wherein the first opening is moved into an open configuration, the second opening is moved into an open configuration, and the third opening is moved into a closed configuration to cause the compressed gas to displace the piston in the second direction when an operation of the machine occurs.

14. The system of claim 1, wherein the first fluid is system hydraulic oil and wherein the second fluid is transmission fluid.

15. The system of claim 14, wherein a pressure of the system hydraulic oil is greater than a pre-charge pressure of the compressed gas.

* * * * *